United States Patent
Zander et al.

(10) Patent No.: US 10,009,797 B2
(45) Date of Patent: Jun. 26, 2018

(54) BROADCAST CHANNEL BASED ESTIMATION OF FREQUENCY OFFSET

(71) Applicants: Sony Mobile Communications Inc., Tokyo (JP); Sony Corporation, Tokyo (JP)

(72) Inventors: Olof Zander, Södra Sandby (SE); Basuki Priyanto, Lund (SE); Martin Beale, Weybridge (GB); Shin Horng Wong, Weybridge (GB)

(73) Assignees: SONY MOBILE COMMUNICATIONS, INC., Tokyo (JP); SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/007,135

(22) Filed: Jan. 26, 2016

(65) Prior Publication Data
US 2017/0094562 A1   Mar. 30, 2017

Related U.S. Application Data

(63) Continuation-in-part of application No. PCT/EP2015/072175, filed on Sep. 25, 2015.

(51) Int. Cl.
*H04W 24/00* (2009.01)
*H04W 28/20* (2009.01)
*H04J 11/00* (2006.01)
*H04W 72/04* (2009.01)
*H04W 76/00* (2018.01)
*H04L 27/26* (2006.01)
*H04W 24/10* (2009.01)
(Continued)

(52) U.S. Cl.
CPC ............. *H04W 28/20* (2013.01); *H04J 11/00* (2013.01); *H04L 27/2657* (2013.01); *H04L 27/2673* (2013.01); *H04W 24/10* (2013.01); *H04W 72/048* (2013.01); *H04W 76/002* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,574,266 B1 * | 6/2003 | Haartsen | H04W 48/10 370/349 |
| 9,277,519 B1 * | 3/2016 | Pu | H04W 56/005 |
| 2014/0094188 A1 * | 4/2014 | Kazmi | G01S 5/0242 455/456.1 |

OTHER PUBLICATIONS

International Search Report from corresponding International Patent Application No. PCT/EP2015/072175, dated Jun. 9, 2016.
(Continued)

*Primary Examiner* — Suhail Khan
(74) *Attorney, Agent, or Firm* — Tucker Ellis LLP; Evan Perry

(57) ABSTRACT

A radio device applies a carrier frequency for transmission of data between the radio device and a base station of a cellular network. Further, the radio device configures a measurement time interval in which the radio device temporarily switches from the transmission of data to receiving at least one broadcast signal conveying system information from the base station. Based on the received at least one broadcast signal, the radio device estimates an offset of the carrier frequency as applied by the radio device to a frequency of a carrier signal as received from the base station.

17 Claims, 7 Drawing Sheets

(51) Int. Cl.
   *H04W 88/02* (2009.01)
   *H04W 88/08* (2009.01)

(56) References Cited

OTHER PUBLICATIONS

Qualcomm Incorporated, "PBCH Repetition for MTC", R1-153851, 3GPPP TSG RAN WG1 #82, Aug. 24-28, 2015, Beijing, China.
LG Electronics, "Measurement Gap Configuration and Measurement for MTC UEs", R1-152697, 3GPP TSG RAN NG1 Meeting #81, May 25-29, 2015, Fukuoka, Japan.
Sony, "Considerations on Measurement Gaps for LC-MTC", R1-155882, 3GPP TSG RAN WG1 Meeting #82bis, Oct. 5-9, 2015, Malmo, Sweden.
3GPP TSG RAN WG1 Meeting #81, R1-153085, "Tracking of Frequency Offset for MTC," Sony, Fukuoka, Japan, May 25-29, 2015.
3GPP TSG RAN WG1 #82, R1-153851, "PBCH Repetition for MTC," Qualcomm Incorporated, Beijing, China, Aug. 24-28, 2015.
3GPP TSG RAN WG1 Meeting #82, R1-154230, "Measurement Gap Configuration and Measurement for MTC UEs," LG Electronics, Beijing, China, Aug. 24-28, 2015.
3GPP TSG RAN WG1 Meeting #82, R1-153727, "Returning Gaps for MTC," Ericsson, Beijing, China, Aug. 24-28, 2015.

\* cited by examiner

US 10,009,797 B2

BROADCAST CHANNEL BASED ESTIMATION OF FREQUENCY OFFSET

RELATED APPLICATION DATA

This application is a continuation-in-part of International Patent Application No. PCT/EP2015/072175, filed Sep. 25, 2015, the disclosure of which is incorporated herein by reference in its entirety.

FIELD OF THE INVENTION

The present invention relates to methods of estimating a frequency offset between a base station of a cellular network and a radio device operated in the cellular network, and to corresponding devices.

BACKGROUND OF THE INVENTION

In cellular networks, such as a cellular network based on the LTE (Long Term Evolution) radio technology specified by 3GPP ($3^{rd}$ Generation Partnership Project), it is typically required that a frequency utilized by a radio receiver/transmitter in a user equipment (UE) matches a frequency utilized by a radio receiver/transmitter in a base station of the cellular network, in the LTE radio technology referred to as eNB (evolved Node B). To meet this requirement, the UE may perform frequency offset measurements based on reference signals transmitted by the base station. In the LTE radio technology, these frequency measurements are typically performed on cell-specific reference symbols (CRS) which are distributed over a wide frequency band of up to 20 MHz.

One aspect of the LTE radio technology specifically addresses Machine Type Communications (MTC) and a corresponding class of UEs, referred to as MTC device, as well as specific features to support efficient MTC have been defined on both on the network side and the UE side. For example, an MTC device is typically operated in a narrow frequency band of 1.4 MHz. This operation is also referred to as narrowband LTE. In a specific variant referred to as NB-IoT (Narrow Band Internet of Things), the utilized bandwidth can be even as small as 200 kHz.

In view of the operating bandwidth being is smaller than the total bandwidth offered by the eNB, frequency offset measurements based on CRS may be problematic in the case of an MTC device. Specifically, due to the limited bandwidth the MTC device is not able to receive all CRS which are distributed over the entire bandwidth offered by the eNB.

Accordingly, there is a need for techniques that allow for efficiently estimating the frequency offset, specifically by radio devices operated with a limited frequency bandwidth, which is smaller than a total bandwidth utilized by the base station.

SUMMARY OF THE INVENTION

According to an embodiment, a method of controlling radio transmission in a cellular network is provided. According to the method, a radio device applies a carrier frequency for transmission of data between the radio device and a base station of the cellular network. Further, the radio device configures a measurement time interval. In the measurement time interval, the radio device temporarily switches from the transmission of data to receiving at least one broadcast signal conveying system information from the base station. Based on the received at least one broadcast signal, the radio device estimates an offset of the carrier frequency as applied by the radio device to frequency of a carrier signal received from the base station.

According to an embodiment, the radio device may receive configuration information defining the measurement time interval from the base station. In some scenarios, the radio device may request the configuration information from the base station. In other scenarios, the transmission of the configuration information may be initiated by the base station. Alternatively or in addition, configuration information defining the measurement time interval may also be preconfigured in the radio device.

According to an embodiment, the transmission of data is performed in a first frequency band and the receiving of the broadcast signal is performed in a second frequency band which is different from the first frequency band.

According to a further embodiment, a method of controlling radio transmission in a cellular network is provided. According to the method, a base station of the cellular network determines a carrier signal for transmission of data between at least one radio device and the base station. Further, the base station configures a measurement time interval in which the radio device temporarily switches from said transmission of data to receiving at least one broadcast signal conveying system information from the base station. The received at least one broadcast signal is utilized by the radio device for estimating of an offset of a carrier frequency as applied by the radio device to a frequency of the carrier signal as received by the radio device from the base station.

According to an embodiment, the base station may send configuration information defining the measurement time interval to the at least one radio device. The base station may send the configuration information in response to a request from the radio device. In other scenarios, the sending of the configuration information may be initiated by the base station.

According to a further embodiment, a radio device is provided. The radio device comprises a radio interface for connecting to a cellular network.

Further, the radio device comprises one or more processors configured to:
apply a carrier frequency for transmission of data between the radio device and a base station of the cellular network;
configure a measurement time interval in which the radio device temporarily switches from said transmission of data to receiving at least one broadcast signal conveying system information from the base station; and
based on the received at least one broadcast signal, estimate an offset of the carrier frequency as applied by the radio device to a frequency of a carrier signal received from the base station.

In particular, the at least one processor of the radio device may be configured to perform the steps as performed by the radio device in the abovementioned method.

According to a further embodiment, a base station for a cellular network is provided. The base station comprises a radio interface to at least one radio device. Further, the base station comprises one or more processors configured to:
determine a carrier signal for transmission of data between the at least one radio device and the base station; and
configure a measurement time interval in which the radio device temporarily switches from said transmission of data to receiving at least one broadcast signal conveying system information from the base station, wherein the received at least one broadcast signal is utilized by the radio device for estimating of an offset of a carrier frequency as applied by the radio device to a frequency of the carrier signal as received by the radio device from the base station.

In particular, the at least one processor of the base station may be configured to perform the steps as performed by the base station in the abovementioned method.

In the above embodiments, the at least one broadcast signal may comprise a Physical Broadcast Channel (PBCH), a PSS (Primary Synchronization Signal), and a Secondary Synchronization Signal (SSS) as specified for the LTE radio technology. Since these signals are transmitted in a narrow frequency band covering 72 central subcarriers within the total frequency band of the LTE radio technology, they are suitable for efficient estimation of the frequency offset even if the radio device supports only data transmission in a narrow frequency band. In MTC, the PBCH can be repeated many times. Thus, all or some parts of it can be used for precise frequency offset estimation/measurement purposes. The measurement time interval allows for efficient coordination of the frequency offset measurement with the data transmission operation of the radio device. In particular, both the radio device and the base station may be made aware of the measurement interval so that it can be avoided that the frequency offset measurement interferes with the data transmission.

According to an embodiment, the same measurement time interval may be applied by multiple radio devices for receiving the broadcast signal. Alternatively or in addition, a different measurement time interval may be applied by at least one other radio device for receiving the at least one broadcast signal.

According to an embodiment, the carrier frequency is changed according to a frequency hopping pattern. The measurement interval may then be set to occur while an operating frequency band around the carrier frequency utilized in the transmission of data matches a frequency band for transmitting the at least one broadcast signal.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to a scenario in which a radio device applies a carrier frequency for data transmission between the radio device and a base station of the cellular network, which may deviate from a frequency of a carrier signal as received from the base station, although these two frequencies should be nominally the same. Such frequency offset may relate to temperature dependent variations of characteristics of an oscillator from which the carrier frequency is derived by the radio device, to aging of the oscillator, to phase noise, to radio channel variations, and/or to Doppler shifts arising from movement of the radio device relative to the base station. The illustrated concepts aim at efficiently estimating such frequency offset, which in turn allows for compensating the frequency offset, e.g., by tuning the oscillator from which the carrier frequency is derived and/or by taking into account the frequency offset in signal processing performed by the radio device and/or base station.

In the embodiments as illustrated in the following, it is assumed that the radio device is an MTC device operated in a cellular network based on the LTE radio technology. However, it is to be understood that the illustrated concepts could also be applied in connection with other types of radio devices and/or radio technologies.

Figure 1:
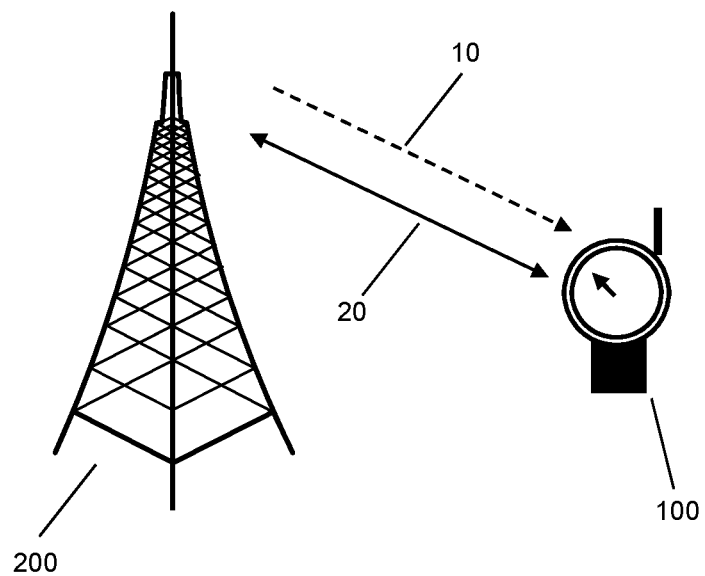
FIG. 1 schematically illustrates a cellular network system according to an embodiment of the invention.

FIG. 1 schematically illustrates a cellular network system according to an embodiment. Specifically, FIG. 1 shows an MTC device 100 and a base station 200, in accordance with the assumed utilization of the LTE radio technology in the following also referred to as eNB. As illustrated, the eNB 200 regularly sends a broadcast signal 10, which can be received by MTC device 100. The broadcast signal 10 has the purpose of conveying system information. In the illustrated example, it is assumed that the broadcast signal 10 is a PBCH, which conveys system information to be used by the MTC device 10 or other radio devices for accessing a cell served by the eNB 200. Alternatively or in addition, the broadcast signal may 10 also correspond to a PSS and SSS, which also convey system information in the form of as physical layer cell identity. On the basis of the broadcast signal 10, the MTC device 100 can access the cell and perform transmission of data 20 with the eNB 200, e.g., on a PDSCH (Physical Downlink Shared Channel) or a PUSCH (Physical Uplink Shared Channel). In these transmissions, a frequency offset may occur between the carrier frequency applied by the MTC device 100 and the frequency of the carrier signal as received by the MTC device 100 from the eNB 200.

Figure 2:
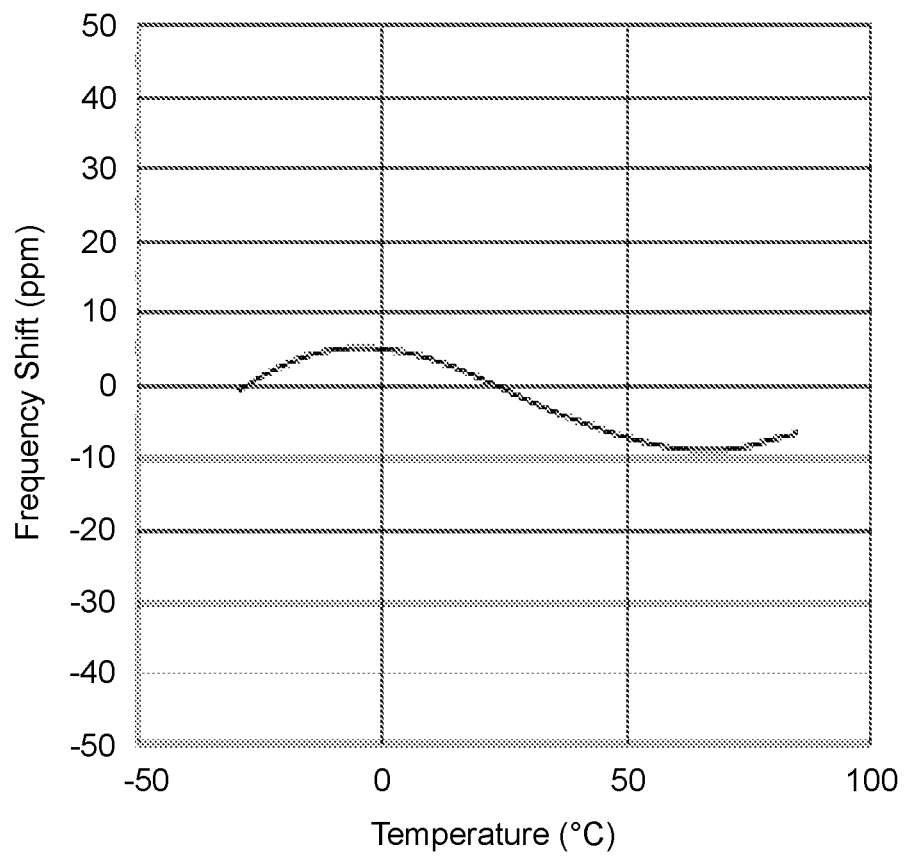
FIG. 2 shows an example of temperature-dependent frequency variations that may occur in a radio device.

It is assumed that the MTC device 100 tracks this frequency offset in a regular or continuous manner. In this way, for example a temperature variation of the MTC device 100 may be taken into account. Such temperature variations may cause variations of a frequency of an oscillator used in the MTC device 100 for deriving the carrier frequency. Such frequency variations may depend in a non-linear manner on the temperature, as by way of example illustrated in FIG. 2. Thus, even if the temperature could be measured, it would be difficult to precisely predict the amount of frequency offset. In a typical scenario, the temperature of the MTC device 100 may vary at a rate of up to 0.5° C./sec, and the associated frequency error of a crystal oscillator (XO) can be up to 0.6 ppm/° C. Thus, within 0.5 sec operation of the MTC device 100, the frequency error can be up to 300 Hz for a carrier frequency of 2 GHz.

In order to minimize heating problems, the oscillator of the MTC device 100 may be placed as far as possible from the actual transmitter/receiver module. However, in view of MTC device typically having a relatively small size, a temperature dependent variable frequency offset will typically remain.

Further, also oscillator aging may contribute to the frequency offset. Typically, the oscillator crystal is utilized in connection with other circuit components, e.g., a capacitor, which are subject to considerable aging effects. This can result in a frequency error of ±5 ppm/year, corresponding to ±10 KHz/year for a carrier frequency of 2 GHz.

Further, also phase noise may contribute to the frequency offset, specifically when considering that utilization of a low cost oscillator may be desirable in the MTC device 100 and that such low-cost oscillators often have a relatively high level of phase noise.

Further, also radio channel variations or Doppler shift may contribute to the frequency offset. Typically, characteristics of the radio channel between the MTC device 100 and the eNB 200 are varies over time and frequency, which may cause variations of the frequency of the received carrier signal. Further, the frequency may vary due to Doppler shift effects caused by device also introduces a Doppler shift depending on velocity of the MTC device 100 relative to the eNB 200.

In the LTE radio technology, CRS may generally be utilized for tracking the frequency offset. However, in the case of narrowband LTE as for example used for MTC, only a limited number of CRS can be received by the MTC device 100, which may result in an increased error of the estimated frequency offset. Such problems may be further enhances when a low SNR (Signal to Noise) operation for extended coverage is selected (e.g. based on an extended coverage SNR of −15 dB). In the illustrated concepts, the MTC device 100 thus alternatively or additionally bases the estimation of the frequency offset on other signals, in particular at least one broadcast signal conveying system information from the eNB 200. As mentioned above, such broadcast signal may include the PBCH, but also the PSS and/or SSS. For each of these broadcast signals, utilization as reference signals for frequency offset estimation is possible. In some scenarios, such utilization may be further supported by an allocation of the broadcast signal to densely distributed resource blocks of the LTE radio technology. For example, the broadcast signal can be repeated frequently to target the MTC device 100, similar to repetition of the PBCH as used in coverage enhancement mode for MTC proposed for LTE Release 13. The estimation process may be based on known algorithms for frequency offset measurement, e.g. based on correlation of signals, such as described in "Carrier Frequency Synchronization in the Downlink of 3GPP LTE", by Qi Wang, Christian Mehlfuhrer, and Markus Rupp, 2010 IEEE 21st International Symposium on Personal Indoor and Mobile Radio Communications (September 2010).

The limited bandwidth operation of the MTC device 100 is taken into account by configuring one or more measurement time intervals, in the following also referred to as measurement gaps. During these measurement gaps, the MTC device 100 switches from normal transmission of data to the reception of the broadcast signal, e.g., the PBCH. By configuring the measurement gap in the MTC device 100 and the eNB 200, it can be avoided that the MTC device 100 or the eNB 200 attempt to perform transmissions of data while the MTC device 100 receives the broadcast signal.

Accordingly, the MTC device 100 may switch to receiving the broadcast signal even if the broadcast signal is transmitted in a frequency band which is different from an operating frequency as currently utilized for the transmission of data. For example, the MTC device 100 may perform the transmission of data in narrowband operation in an operating frequency band of 1.4 MHz at an upper limit of the total LTE frequency bandwidth of 20 MHz and, during the measurement gap, temporarily switch to a central frequency band of 1.4 MHz in which the eNB 100 transmits the PBCH, PSS and SSS. During this time, neither the MTC device 100 nor the eNB 200 will attempt to perform a transmission of data in the operating frequency band at the upper limit of the total LTE frequency bandwidth.

In the LTE radio technology, the PBCH has the purpose of conveying system information which allows a UE, such as the MTC device 100, to access the cellular network. For example, the MTC device 100 may decode the PBCH to receive a MIB (Master Information Block) and various SIBs (System Information Blocks) specifying parameters to be applied by the MTC device 100 when initially accessing the cell served by the eNB 200. The PBCH is transmitted in a frequency band formed by the central 72 subcarriers of the total LTE frequency bandwidth (also referred to as center narrowband). Once the MTC device 100 has gained access to the cell, it can switch to other frequency bands for transmission of other signals, e.g., control channels such as the PDCCH (Physical Downlink Control Channel) or PUCCH (Physical Uplink Control Channel) or data channels such as the PDSCH or PUSCH. Conventionally, the PBCH is transmitted regularly every 10 ms, but only decoded once when accessing the cell. In the illustrated concepts, the MTC device 100 may however decode the PBCH repeatedly. Further, the repetition period of transmitting the PBCH by the eNB 200 may also be increased at least temporarily to better support the estimation of the frequency offset.

In an exemplary implementation, the tracking of the frequency may work as follows: Both the eNB 200 and the MTC device 100 are aware of the utilization of the PBCH for tracking of the frequency offset. Specifically, one or more measurement gaps are configured both in the eNB 200 and the MTC device 100, e.g., as a periodic pattern. The measurement gap coincides with the transmission of the PBCH by the eNB 200. During the measurement gap, the MTC device 100 switches to receiving the PBCH, and normal transmission of data is typically interrupted. If a periodic pattern of measurement gaps is used, the period of the measurement gaps can be a multiple of the PBCH repetition period as applied by the eNB 200. Configuration information defining the measurement gaps (e.g., in terms of period and duration) can be determined by the eNB 200 and sent to the MTC device 100 and/or can be preconfigured in the MTC device 100 and/or the eNB 200. In some scenarios, the MTC device 100 may also request such configuration information from the eNB 200, e.g., if the estimated frequency offset changes rapidly and a more dense pattern of measurement gaps is needed for tracking the frequency offset with the desired precision. The configuration information can be static or may vary dynamically, e.g., depending on utilized coverage enhancements level, or velocity category of the MTC device 100.

When the measurement gap occurs, the MTC device 100 switches to reception in the central narrowband to receive the PBCH. The MTC device 100 then estimates the frequency offset, which may be accomplished in realtime during the measurement gap. Alternatively or in addition, the PBCH as received or decoded may also be stored by the MTC device 100 so as to be utilized by the MTC device 100 for estimation of the frequency offset at a later time. Such storage of the received PBCH may also be utilized for performing the estimation of the frequency offset based on the PBCH as received in multiple measurement gaps.

Figure 3A:
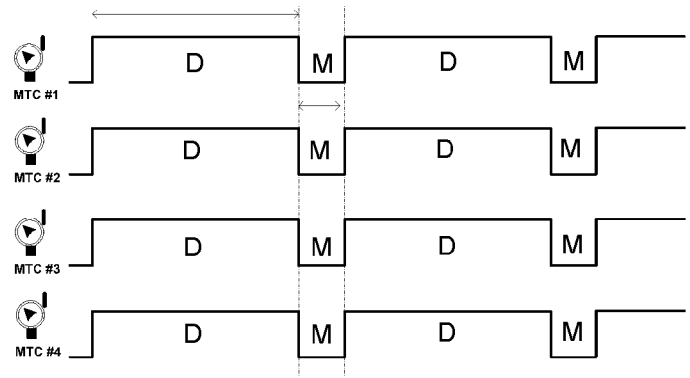
FIGS. 3A, 3B, and 3C schematically illustrate measurement time intervals according to an embodiment of the invention.

The measurement gap(s) can be configured by the eNB 200 and applied to multiple MTC devices, e.g., all MTC devices in the cell of the eNB 200, as schematically illustrated in FIG. 3A for MTC devices #1, #2, #3, and #4, where M denotes a measurement gap and D denotes an interval for data transmission. In this case, the multiple MTC devices may perform the estimation of the frequency offset during the same measurement gap.

Figure 3B:
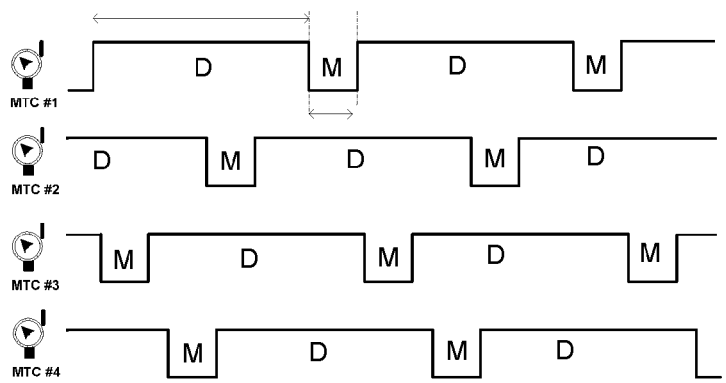
Figure 3C:
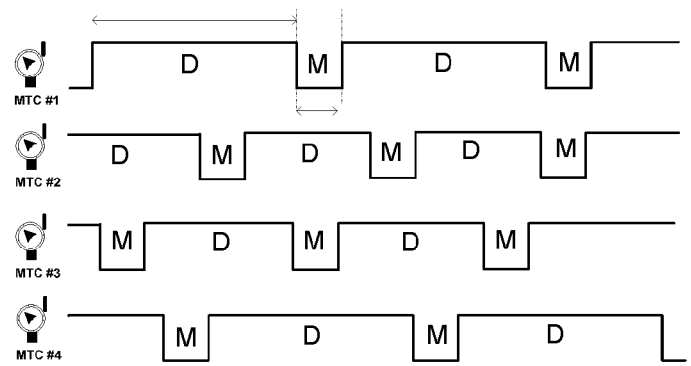

The eNB 200 may also configure the measurement gap(s) individually for each of multiple MTC devices, as schematically illustrated in FIGS. 3B and 3C for MTC devices #1, #2, #3, and #4, where M denotes a measurement gap and D denotes an interval for data transmission. These individually configured measurement gap(s) between the MTC devices with respect to an offset of a periodic pattern (as shown in FIG. 3B) or with respect to a period of a periodic pattern (as shown in FIG. 3C).

In some scenarios, both offset and period may be configured individually for each MTC device. Further, it is also possible that the eNB 200 configures some MTC devices with the same measurement gap(s) while one or more other MTC devices are configured individually.

In some scenarios, the carrier frequency applied by the MTC device 100 may be changed according to a frequency hopping scheme. In such cases, the frequency hopping may cause the MTC device 100 to change to the center narrowband in which the PBCH is transmitted. On this occasion, the MTC device 100 may also receive the PBCH for the purpose of estimating the frequency offset. This may be accomplished without interrupting the transmission of data. In such scenarios, the measurement gap(s) may thus be configured to be triggered when the MTC device 100 utilizes the center narrowband in which the PBCH is transmitted for regular transmission of data.

In some scenarios, the measurement gap(s) could also be configured to be triggered when there is an increased number of PBCH repetitions, e.g., when applying a high coverage enhancement level. In such cases, the MTC device 100 may switch to receive at least part of repeated PBCH transmissions for frequency offset estimation, typically not all the repeated PBCH transmissions. During reception and decoding of the repeated PBCH transmissions, at least a part of the repeated PBCH can be stored by the MTC device 100. The stored part of the PBCH can then be used for estimation of the frequency offset.

Figure 4:
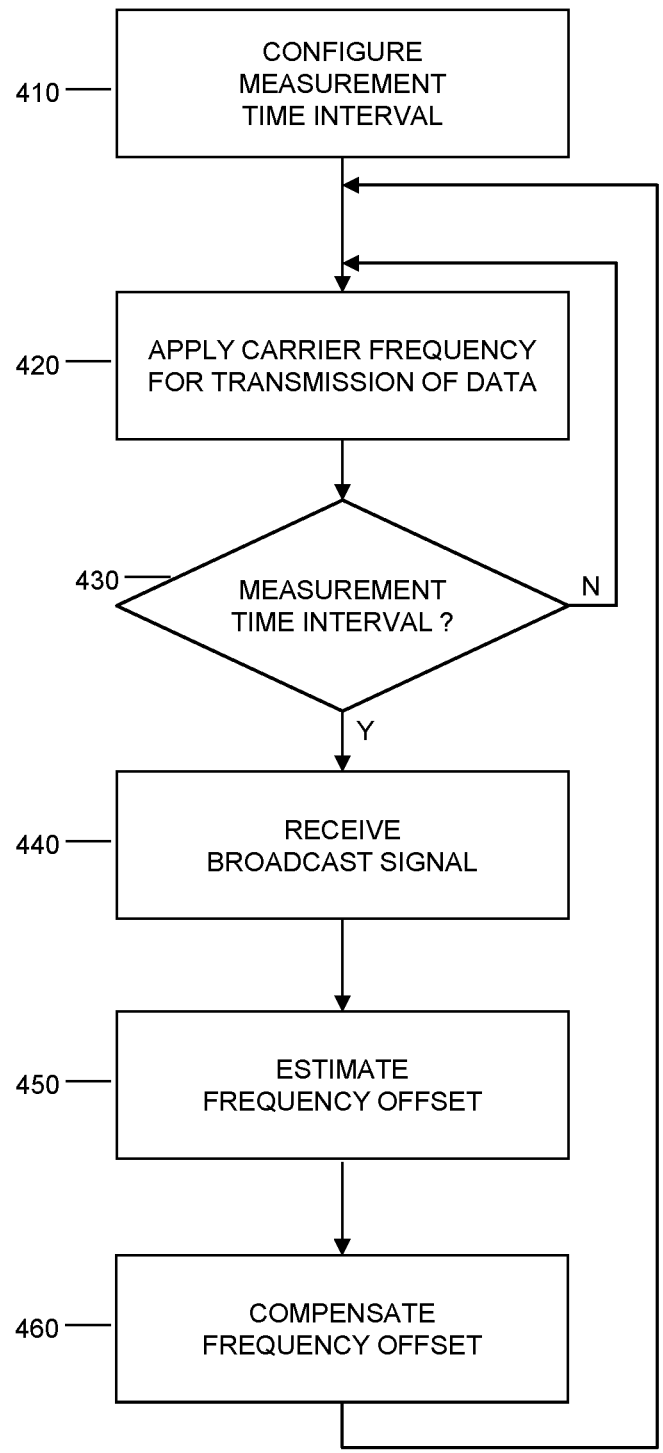
FIG. 4 shows a flowchart for illustrating a method according to an embodiment of the invention.

FIG. 4 shows a flowchart illustrating a method of controlling radio transmissions in a cellular network, by which a radio device, e.g., the MTC device 100, may implement concepts as described above. If a processor based implementation of the radio device is utilized, at least a part of the steps of the method may be performed and/or controlled by one or more processors of the radio device.

At step 410, the radio device configures at least one measurement time interval, e.g., in terms of a periodic pattern, duration, and/or a rule for triggering the measurement time interval. For this purpose, the radio device may receive configuration information defining the measurement time interval from the base station, e.g., in response to sending a request for the configuration information to the base station. Alternatively or in addition, configuration information defining the measurement time interval may also be preconfigured in the radio device.

At step 420, the radio device applies a carrier frequency for transmission of data between the radio device and a base station of the cellular network, e.g., the eNB 200. For example, the carrier frequency may be a frequency of a local carrier signal used by the radio for demodulation of a carrier signal received from the base station. However, the carrier frequency could also be a frequency of a carrier signal transmitted from the radio device to the base station. The carrier frequency may be derived from an oscillator of the radio device.

At step 430, the radio device may detect whether the measurement time interval has started. As indicated by branch "N", if the measurement time interval has not started, the radio device may return to step 420, e.g., to continue with transmission of data based on the carrier frequency. Otherwise, the radio device may proceed to step 440, as indicated by branch "Y".

At step 440, the radio device receives a broadcast signal conveying system information from the base station. The broadcast signal may for example include a PBCH, a PSS, and/or an SSS of the LTE radio technology. In some scenarios, the transmission of data is performed in a first frequency band, and the broadcast signal is received in a second frequency band which is different from the first frequency band. For example, the broadcast signal may be received in the central narrowband of the total LTE bandwidth, and the transmission of data may be performed in another frequency band within the total LTE bandwidth.

In some scenarios, the carrier frequency may be changed according to a frequency hopping pattern. The measurement time interval may then be triggered to occur while an operating frequency band around the carrier frequency utilized in the transmission of data matches a frequency band for transmitting the at least one broadcast signal.

At step 450, the radio device estimates an offset of the carrier frequency to a frequency of a carrier signal received from the base station. This estimation may for example be based to correlation of a signal derived from the received broadcast signal to a signal based on the carrier frequency.

At step 460, the radio device may compensate the offset estimated at step 450, e.g., by tuning an oscillator from which the carrier frequency is derived and/or by adapting signal processing of received or transmitted signals.

Figure 5:
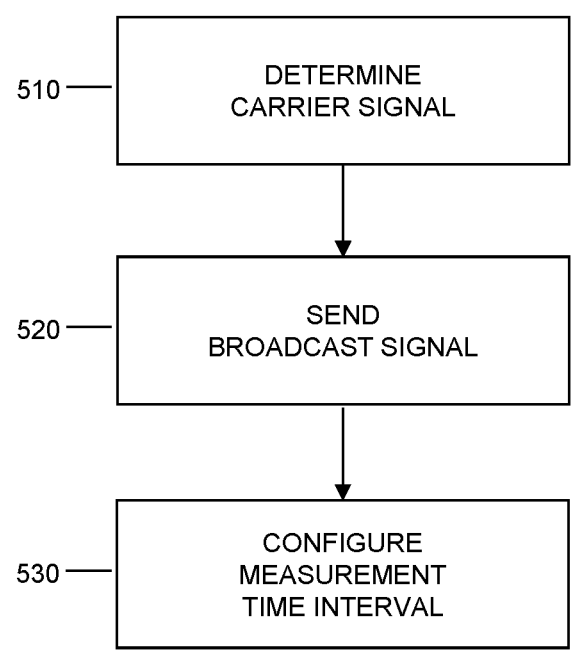
FIG. 5 shows a flowchart for illustrating a further method according to an embodiment of the invention.

FIG. 5 shows a flowchart illustrating a method of controlling radio transmissions in a cellular network, by which a base station, e.g., an eNB such as the eNB 200, may implement concepts as described above. If a processor based implementation of the base station is utilized, at least a part of the steps of the method may be performed and/or controlled by one or more processors of the base station.

At step 510, the base station determines a carrier signal for transmission of data between at least one radio device, e.g., an MTC device such as the MTC device 100, and the base station. The carrier signal may for example be selected from a set of available carrier signals within a total LTE bandwidth. The carrier signal may be derived from an oscillator of the base station.

At step 520, the base station transmits a broadcast signal conveying system information. The broadcast signal may for example include a PBCH, a PSS, and/or an SSS of the LTE radio technology. In some scenarios, the transmission of data is performed in a first frequency band, and the broadcast signal is received in a second frequency band which is different from the first frequency band. For example, the broadcast signal may be received in the central narrowband of the total LTE bandwidth, and the transmission of data may be performed in another frequency band within the total LTE bandwidth.

At step 530, the base station configures at least one measurement time interval for the at least one radio device, e.g., in terms of a periodic pattern, duration, and/or a rule for triggering the measurement time interval. For this purpose, the base station may send configuration information defining the measurement time interval to at least one radio device, e.g., in response to receiving a request for the configuration information from the radio device. Alternatively or in addition, configuration information defining the measurement time interval may also be preconfigured in the radio device and/or the base station.

In some scenarios, the carrier frequency may be changed according to a frequency hopping pattern. The measurement time interval may then be triggered to occur while an operating frequency band around the carrier frequency utilized in the transmission of data matches a frequency band for transmitting the at least one broadcast signal.

In the measurement time interval, the radio device temporarily switches from the transmission of data to receiving the at least one broadcast signal conveying system information from the base station. The received at least one broadcast signal is utilized by the radio device for estimating of an offset of a carrier frequency as applied by the radio device to a frequency of the carrier signal as received by the radio device from the base station.

The configuration may also relate to operations of the base station with respect to the radio device. For example, the base station may configure its operation to interrupt transmissions of data to the radio device during the measurement time interval.

Figure 6:
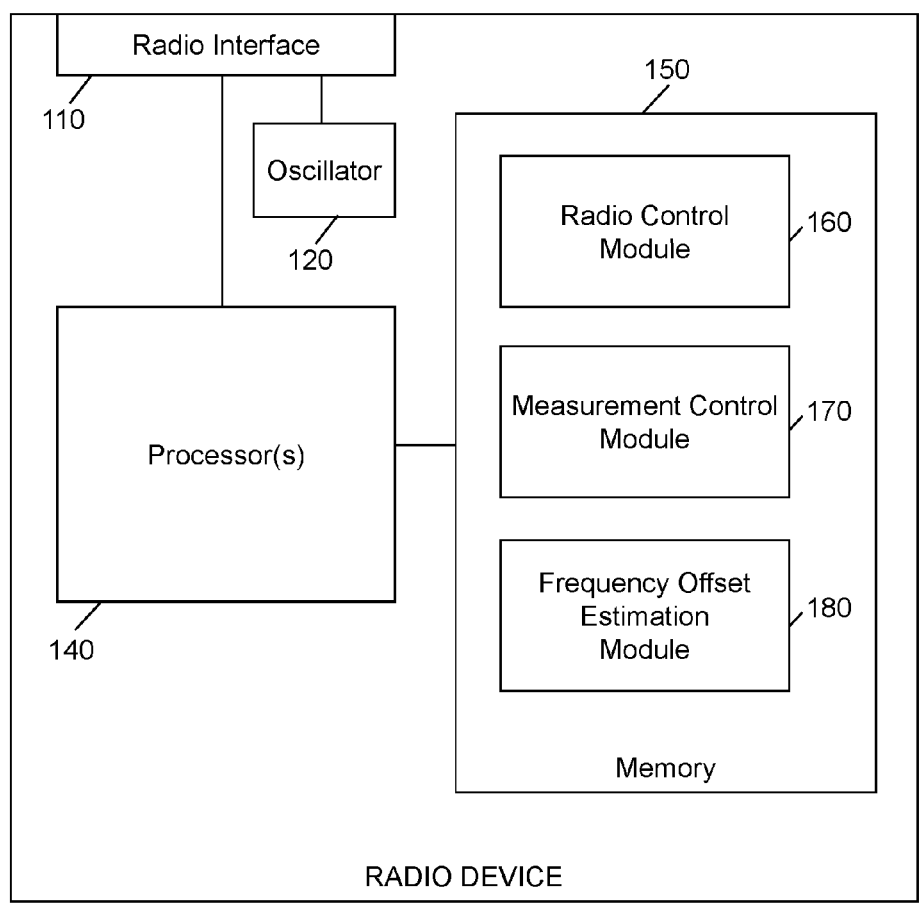
FIG. 6 schematically illustrates a processor-based implementation of a radio device according to an embodiment of the invention.

It is to be understood that the methods of FIGS. 4 and 5 may also be combined in a system including a base station operating according to the method of FIG. 6 and at least one radio device operating according to the method of FIG. 5.

FIG. 6 shows a block diagram for schematically illustrating a processor based implementation of a radio device which may be utilized for implementing the above concepts. The radio device may for example correspond to an MTC device, such as the MTC device 100 of FIG. 1.

As illustrated, the radio device includes a radio interface 110. The radio device may utilize the radio interface 110 for connecting to a cellular network, e.g., through a base station of the cellular network, such as the eNB 200. Further, the radio device is provided with an oscillator 120 from which carrier frequencies and/or carrier signals used in radio transmissions through the radio interface 110 can be derived.

Further, the radio device is provided with one or more processors 140 and a memory 150. The radio interface 110, and the memory 150 are coupled to the processor(s) 140, e.g., using one or more internal bus systems of the radio device.

The memory 150 includes program code modules 160, 170, 180 with program code to be executed by the processor(s) 140. In the illustrated example, these program code modules include a radio control module 160, a measurement control module 170, and a frequency offset estimation module 180.

The radio control module 160 may implement the above-described functionalities of performing transmissions of data and receiving the broadcast signal. The measurement control module 170 may implement the above-described functionalities of configuring the measurement time intervals and switching to receiving the broadcast signal during the measurement time intervals. The frequency offset estimation module 180 may implement the above-described functionalities of estimating the frequency offset from the broadcast signal received during the measurement time interval(s).

It is to be understood that the structures as illustrated in FIG. 6 are merely exemplary and that the radio device may also include other elements which have not been illustrated, e.g., structures or program code modules for implementing known functionalities of an MTC device or other type of UE.

Figure 7:
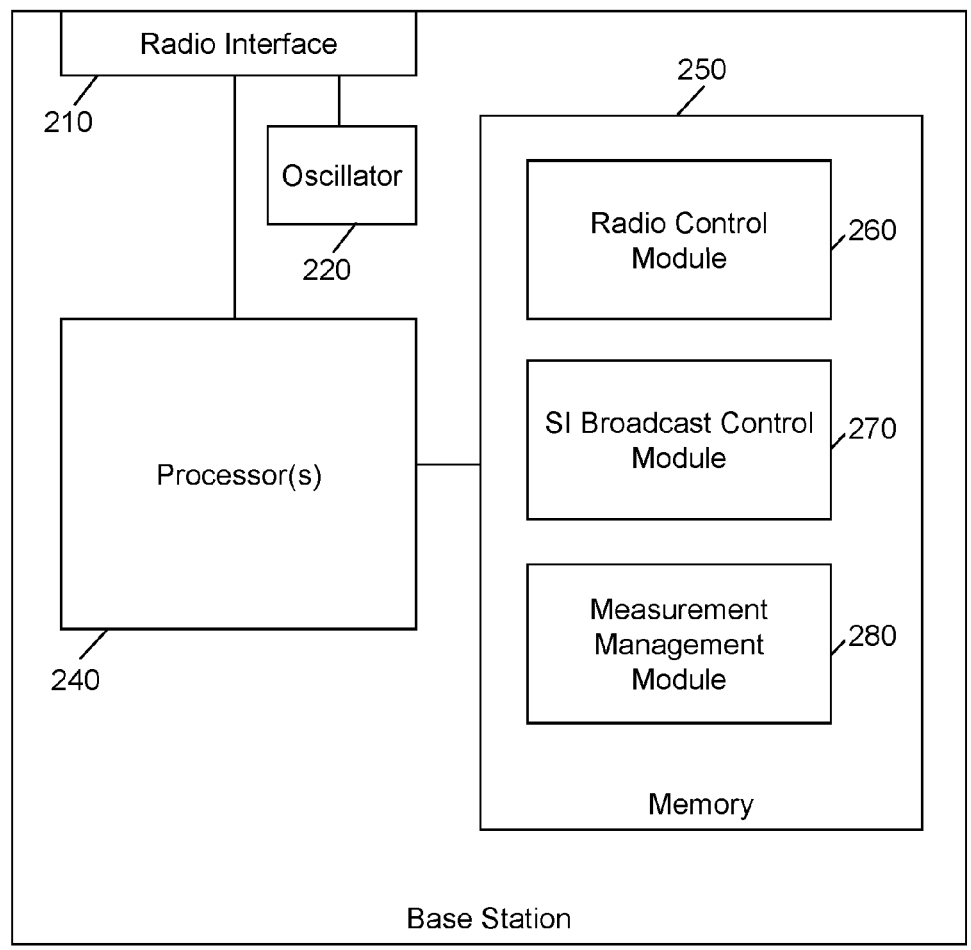
FIG. 7 schematically illustrates a processor-based implementation of a base station according to an embodiment of the invention.

FIG. 7 shows a block diagram for schematically illustrating a processor based implementation of a base station which may be utilized for implementing the above concepts. The base station may for example correspond to an eNB, such as the eNB 200 of FIG. 1.

As illustrated, the base station includes a radio interface 210. The base station may utilize the radio interface 210 for connecting to at least one radio device, e.g., an MTC device such as the MTC device 100. Further, the base station is provided with an oscillator 220 from which carrier frequencies and/or carrier signals used in radio transmissions through the radio interface 210 can be derived.

Further, the base station is provided with one or more processors 240 and a memory 250. The radio interface 210, and the memory 250 are coupled to the processor(s) 240, e.g., using one or more internal bus systems of the base station.

The memory 250 includes program code modules 260, 270, 280 with program code to be executed by the processor(s) 240. In the illustrated example, these program code modules include a radio control module 260, an SI (System Information) broadcast control module 270, and a measurement management module 280.

The radio control module 260 may implement the above-described functionalities of performing transmissions of data. The SI broadcast control module 270 may implement the above-described functionalities of transmitting the broadcast signal conveying system information. The measurement management module 280 may implement the above-described functionalities of configuring the measurement time intervals and controlling operation of the base station in accordance with the configured measurement time intervals, e.g., by temporarily interrupting the transmission of data during the measurement time intervals.

It is to be understood that the structures as illustrated in FIG. 7 are merely exemplary and that the base station may also include other elements which have not been illustrated, e.g., structures or program code modules for implementing known functionalities of an eNB or other type of base station.

It is to be understood that the concepts as explained above are susceptible to various modifications. For example, the concepts could be applied in connection with various kinds of radio technologies and radio devices, without limitation to MTC devices or the LTE radio technology. Further, it is to be understood that the illustrated concepts may also be combined with other techniques for estimating the frequency offset, e.g., techniques based on measurement of CRS.

The invention claimed is:

1. A method of controlling radio transmission in a cellular network, the method comprising:
   a radio device applying a carrier frequency for transmission of data between the radio device and a base station of the cellular network, wherein the carrier frequency changes according to a frequency hopping pattern;
   the radio device configuring a measurement time interval in which the radio device temporarily switches from said transmission of data to receiving at least one broadcast signal conveying system information from the base station, wherein the measurement time interval is configured to occur at least when the frequency hopping pattern indicates an operating frequency band for the carrier frequency matches a frequency band utilized to transmit the at least one broadcast signal; and based on the received at least one broadcast signal, the radio device estimating a frequency offset between the carrier frequency as applied by the radio device and a frequency of a carrier signal as received from the base station.

2. The method according to claim 1, comprising:
the radio device receiving configuration information defining the measurement time interval from the base station.

3. The method according to claim 2, comprising:
the radio device requesting the configuration information from the base station.

4. The method according to claim 1,
wherein configuration information defining the measurement time interval is preconfigured in the radio device.

5. The method according to claim 1,
wherein said transmission of data is performed in a first frequency band and said receiving of the broadcast signal is performed in a second frequency band which is different from the first frequency band.

6. The method according to claim 1,
wherein the at least one broadcast signal comprises a Physical Broadcast Channel of the LTE radio technology.

7. The method according to claim 1,
wherein the at least one broadcast signal comprises a Primary Synchronization Signal and/or Secondary Synchronization Signal of the LTE radio technology.

8. A method of controlling radio transmission in a cellular network, the method comprising:
a base station of the cellular network determining a carrier signal for transmission of data between at least one radio device and the base station, wherein the carrier frequency is changed according to a frequency hopping pattern; and the base station configuring a measurement time interval in which the radio device temporarily switches from said transmission of data to receiving at least one broadcast signal conveying system information from the base station, wherein the measurement time interval occurs while, according to the frequency hopping pattern, an operating frequency band around the carrier frequency utilized in the transmission of data matches a frequency band for transmitting the at least one broadcast signal.

9. The method according to claim 8, comprising:
the base station sending configuration information defining the measurement time interval to the at least one radio device.

10. The method according to claim 9, comprising:
the base station sending the configuration information in response to a request from the radio device.

11. The method according to claim 8,
wherein said transmission of data is performed in a first frequency band and said receiving of the broadcast signal is performed in a second frequency band which is different from the first frequency band.

12. The method according to claim 8,
wherein the carrier frequency is changed according to a frequency hopping pattern; and
wherein the measurement time interval occurs while, according to the frequency hopping pattern, an operating frequency band around the carrier frequency utilized in the transmission of data matches a frequency band for transmitting the at least one broadcast signal.

13. The method according to claim 8,
wherein the at least one broadcast signal comprises a Physical Broadcast Channel of the LTE radio technology.

14. The method according to claim 8,
wherein the at least one broadcast signal comprises a Primary Synchronization Signal and/or Secondary Synchronization Signal of the LTE radio technology.

15. A radio device, comprising:
a radio interface for connecting to a cellular network; and
one or more processors configured to:
apply a carrier frequency for transmission of data between the radio device and a base station of the cellular network, wherein the carrier frequency changes according to a frequency hopping pattern;
configure a measurement time interval in which the radio device temporarily switches from said transmission of data to receiving at least one broadcast signal conveying system information from the base station, wherein the measurement time interval is configured to occur at least when the frequency hopping pattern indicates an operating frequency band for the carrier frequency matches a frequency band utilized to transmit the at least one broadcast signal; and
based on the received at least one broadcast signal, estimate a frequency offset between the carrier frequency as applied by the radio device and a frequency of a carrier signal as received from the base station.

16. A cellular system comprising:
the radio device according to claim 15; and
the base station, comprising:
a radio interface to the radio device; and
one or more processors configured to:
determine a carrier signal for transmission of data between the radio device and the base station; and
configure a measurement time interval in which the radio device temporarily switches from said transmission of data to receiving at least one broadcast signal conveying system information from the base station, wherein the received at least one broadcast signal is utilized by the radio device for estimating a frequency offset between the carrier frequency as applied by the radio device and a frequency of the carrier signal as received from the base station.

17. A base station for a cellular network, the base station comprising:
a radio interface to at least one radio device; and
one or more processors configured to:
determine a carrier signal for transmission of data between the at least one radio device and the base station, wherein the carrier frequency is changed according to a frequency hopping pattern; and
configure a measurement time interval in which the radio device temporarily switches from said transmission of data to receiving at least one broadcast signal conveying system information from the base station, wherein the measurement time interval occurs while, according to the frequency hopping pattern, an operating frequency band around the carrier frequency utilized in the transmission of data matches a frequency band for transmitting the at least one broadcast signal.

* * * * *